United States Patent
Hukmani et al.

(10) Patent No.: US 12,430,299 B2
(45) Date of Patent: Sep. 30, 2025

(54) QUANTUM COMPUTING SYSTEM WITH SECURED MULTI-SOURCE CLOUD APPLICATION PROGRAMMING INTERFACE

(71) Applicant: Bank of America Corporation, Charlotte, NC (US)

(72) Inventors: Ravi Kiran Hukmani, Hyderabad (IN); Mohana Madhuri Patri, Hyderabad (IN); Kalyan Pallapolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 235 days.

(21) Appl. No.: 18/151,870

(22) Filed: Jan. 9, 2023

(65) Prior Publication Data

US 2024/0232146 A1    Jul. 11, 2024

(51) Int. Cl.
*G06F 16/21* (2019.01)
*G06F 9/54* (2006.01)
*G06F 16/25* (2019.01)
*G06F 21/60* (2013.01)
*G06N 10/80* (2022.01)

(52) U.S. Cl.
CPC ............ *G06F 16/212* (2019.01); *G06F 9/541* (2013.01); *G06F 16/258* (2019.01); *G06F 21/602* (2013.01); *G06N 10/80* (2022.01)

(58) Field of Classification Search
CPC ...... G06F 16/212; G06F 9/541; G06F 16/258; G06F 21/602; G06N 10/80
See application file for complete search history.

(56) References Cited

U.S. PATENT DOCUMENTS

| | | | | |
|---|---|---|---|---|
| 9,081,805 | B1* | 7/2015 | Stamen | G06F 21/602 |
| 9,418,052 | B2* | 8/2016 | Shelby | G06F 40/143 |
| 9,811,394 | B1* | 11/2017 | Kogias | H04L 67/34 |
| 10,944,685 | B2* | 3/2021 | Conti | H04L 47/70 |
| 11,288,442 | B2* | 3/2022 | Herreria | G06F 40/154 |
| 2007/0143285 | A1* | 6/2007 | Drumm | G06F 16/84 |
| | | | | 707/999.005 |
| 2008/0133929 | A1* | 6/2008 | Gehrmann | G06F 21/51 |
| | | | | 713/179 |

(Continued)

*Primary Examiner* — Jimmy H Tran
(74) *Attorney, Agent, or Firm* — Banner & Witcoff, Ltd.

(57) ABSTRACT

Various aspects of the disclosure relate to a quantum cloud enabled API parsing engine to automatically and intelligently identify API based schemas improves efficiency and dynamically increases accuracy through use of an artificial intelligence-based schema analysis engine. A dynamic request is received from a cloud-based application to fetch data from different sources. The API request is received by a quantum cloud environment including a dual quantum storage system for storing multiple API schemas. The quantum cloud-based application includes an AI-based query schema analysis engine that may process the input request across the various API schemas and then formats the API response before sending back to source cloud-based application. The AI-based query schema analysis engine trains an AI data set to find a match based on a schema variable parameter. The AI-based query schema analysis engine leverages a quantum key pool schema processor generated matched encrypted schema area.

17 Claims, 5 Drawing Sheets

(56) References Cited

U.S. PATENT DOCUMENTS

| | | | | |
|---|---|---|---|---|
| 2008/0313219 | A1* | 12/2008 | Benfield | G06F 40/131 |
| | | | | 707/999.102 |
| 2009/0012986 | A1* | 1/2009 | Arazi | G06F 16/2423 |
| | | | | 707/999.102 |
| 2009/0083297 | A1* | 3/2009 | Pohl | G06F 40/143 |
| 2013/0013648 | A1* | 1/2013 | Monjas Llorente | G06F 16/213 |
| | | | | 707/812 |
| 2016/0350093 | A1* | 12/2016 | Walker | G06F 21/57 |
| 2016/0350303 | A1* | 12/2016 | Fischer | G06F 16/2452 |
| 2017/0364386 | A1* | 12/2017 | Khot | G06F 9/4843 |
| 2018/0150548 | A1* | 5/2018 | Shah | G06F 16/211 |
| 2019/0273745 | A1* | 9/2019 | Oberg | G06Q 10/02 |
| 2019/0325074 | A1* | 10/2019 | Ghezzi | G06F 9/547 |
| 2019/0377713 | A1* | 12/2019 | Lankford | G06F 16/2379 |
| 2020/0285619 | A1* | 9/2020 | Teyer | G06F 16/2282 |
| 2021/0112059 | A1* | 4/2021 | Heldman | H04L 63/0807 |
| 2022/0269654 | A1* | 8/2022 | Hiremath | G06N 20/00 |
| 2022/0391537 | A1* | 12/2022 | Gotthardt | H04W 12/02 |
| 2022/0391821 | A1* | 12/2022 | Boyd | H04L 67/133 |
| 2023/0023645 | A1* | 1/2023 | Retinraj | G06N 3/042 |
| 2023/0169216 | A1* | 6/2023 | Zeng | G06F 21/575 |
| | | | | 713/176 |
| 2023/0244644 | A1* | 8/2023 | Kotecha | G06F 40/295 |
| | | | | 707/803 |
| 2023/0252233 | A1* | 8/2023 | Gutierrez | G06F 40/20 |
| | | | | 704/9 |
| 2023/0289339 | A1* | 9/2023 | Sagar | G06F 16/252 |
| 2023/0367786 | A1* | 11/2023 | Gupta | G06F 9/547 |
| 2024/0086184 | A1* | 3/2024 | Wang | G06N 20/20 |
| 2024/0184769 | A1* | 6/2024 | Nomani | G06F 16/2379 |
| 2024/0313979 | A1* | 9/2024 | Garcia Morchon | G16B 50/30 |
| 2025/0045644 | A1* | 2/2025 | Martín | G06N 5/04 |

\* cited by examiner

QUANTUM COMPUTING SYSTEM WITH SECURED MULTI-SOURCE CLOUD APPLICATION PROGRAMMING INTERFACE

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

As a result of the complexity associated with the operations of a large organization and its computer systems, it may be difficult for such an organization to efficiently, effectively, securely, and uniformly manage its computer systems, and particularly manage how internal computer systems exchange information with external computer systems in providing and/or supporting different products and services offered by the organization.

In some cases, the enterprise organization may utilize one or more cloud-based applications (e.g., a customer relationship management (CRM) application). In an illustrative example, a CRM application may be built on cloud platform which may include many application programming interfaces (APIs) that may be integrated into the CRM application. Such APIs may be used to perform dynamic service requests, such as to fetch data from one or more different relational and/or non-relational databases. Each database may further use different source formats for data stored in the database. As such, the common cloud based application may experience challenges when accessing data from the different databases due to the differing formats and selecting a schema with a compatible format to access the desired data.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

Aspects of the disclosure relate to computer hardware and software. In particular, one or more aspects of the disclosure generally relate to computer hardware and software for a cloud-based quantum computing environment enabled for API parsing for multiple source formatting.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes improved accuracy and efficiency of identifying schemas to access data within multiple databases, each having a differing format. A quantum cloud enabled API parsing engine to automatically and intelligently identify API based schemas improves efficiency and dynamically increases accuracy through use of an artificial intelligence-based schema analysis engine.

In an illustrative example, a dynamic request may be generated and sent from a cloud-based application to fetch data from different sources. The dynamic request may be in the form of an API request, where the API request is received by an application within a quantum cloud environment that may also include a dual quantum storage system for storing multiple API schemas. The quantum cloud-based application may include an AI-based query schema analysis engine that may process the input request across the various API schemas and then formats the API response before sending back to source cloud-based application. Over time, the AI-based query schema analysis engine trains, continuously and/or automatically, an AI data set to find a match based on a schema variable parameter. Additionally, the AI-based query schema analysis engine interacts with a quantum key pool schema processor that returns a matched encrypted schema area.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

In some cases, current CRM applications may be built on a cloud platform that may integrate multiple API's. These APIs may perform dynamic service requests on behalf of one or more applications running multiple data consumer computing devices to fetch data from multiple different relational and/or non-relational databases, where each data base may have a different source format of the stored data. As such, data modification in the cloud environment is more challenging due to these differences. A dynamic process for use in the cloud environment (e.g., a quantum cloud computing environment) may format each of the data fields fetched from differently formatted datasets. Illustrative formats may include a binary format, a JavaScript Object Notation (JSON) format, one or more document formats (e.g., doc, docx, pdf, txt, xls, tiff, and the like), an extensible markup language (XML) format, a structured query language (SQL) format, and/or the like. The dynamic process may transform a formatted object into a cloud compatible data model. Current processes often require large amounts of time and/or computing power to identify proper formats. For example, a current cloud service may incur service call time out errors due to the long processing times. In some cases, processes may be used to split a service call into multiple portions, where each portion performs a different method and many make multiple calls to external databases before sending a response. As such, the cloud computing processes may make multiple calls before formatting the response and thereby causing some potential delay in turn lag in overall application requesting the information. As such, a need has been recognized for an improved process to increase data processing times and increase computing efficiencies by overcoming all the challenges mentioned above.

In some cases, an application may make a dynamic request via an application programming interface (API) function call which may be received from the application (e.g., a cloud-based application) to fetch data from one or more different sources. Many times the format of the data may be unknown and/or may be different based on the data storage technologies. The API request is received by an API processing application within a quantum cloud environment, which may also include a dual quantum storage system for storing multiple API schemas in multiple formats. In some cases, the quantum cloud-based application may be an artificial intelligence enabled application processing one or more models to analyze the API request to identify one or more schemas capable of returning the desired data, independent of the data storage formatting. For example, an AI query schema analyzer may process the received input request based on a model-based analysis across various API schemas and formats. The AI query schema analyzer may identify one or more schemas and may format the API response based on the identified schemas before returning the data to the source application of the API request. The AI query schema analyzer may automatically and/or continuously train the model based on at least one schema variable parameter and may interact with the quantum key pool schema processor to return the matched encrypted schema area.

In some cases, the quantum key pool schema processor may process cloud-based AI request as a centralized resource management system to manage data requests from multiple sources, which may be stored in multiple formats and/or may utilize one or both of a relational database and/or a non-relational database. The quantum key pool schema processor with the AI query schema analyzer may process the API requests with decreased latency using based on the quantum computing implementation of the analysis model. In some cases, the quantum key pool schema processor may convert multiple source schemas with differing formats (e.g., an SQL format, a non-SQL format, and the like) to a common cloud-computing compatible format. In some cases, the calling application may define a format for which information may be returned. In some cases, the AI query schema analyzer and/or the quantum key pool schema processor may process encrypted data and/or may encrypt data to mask sensitive information, such as personal information, or other non-public and/or sensitive information before sending the response. In some cases, the quantum computing environment based quantum key pool schema processor may return a response identified from multiple matching schema formats with or without encryption, based on a best-fit analysis.

In some cases, the systems and/or methods may be used to facilitate use of API function calls integrated into an application (e.g., a customer resource management application a cloud management center application and/or the like) that requests information from a one or more other applications that store information in different formats. For example, an API request may format a response corresponding to one or more multiple source systems into a cloud compatible model by leveraging quantum key pool. The methods and/or systems may perform this conversion within a quantum cloud computing environment using an AI-based model to parse the multiple schemas to avoid delays in schema identification and can format a response to the calling application without using multiple function calls to reduce computing delays an increases computing efficiency. Additionally, the methods and/or systems may provide access to data via an identified schema while providing a mechanism to redact information within the cloud environment based on multiple schema formats.

Figure 1A:
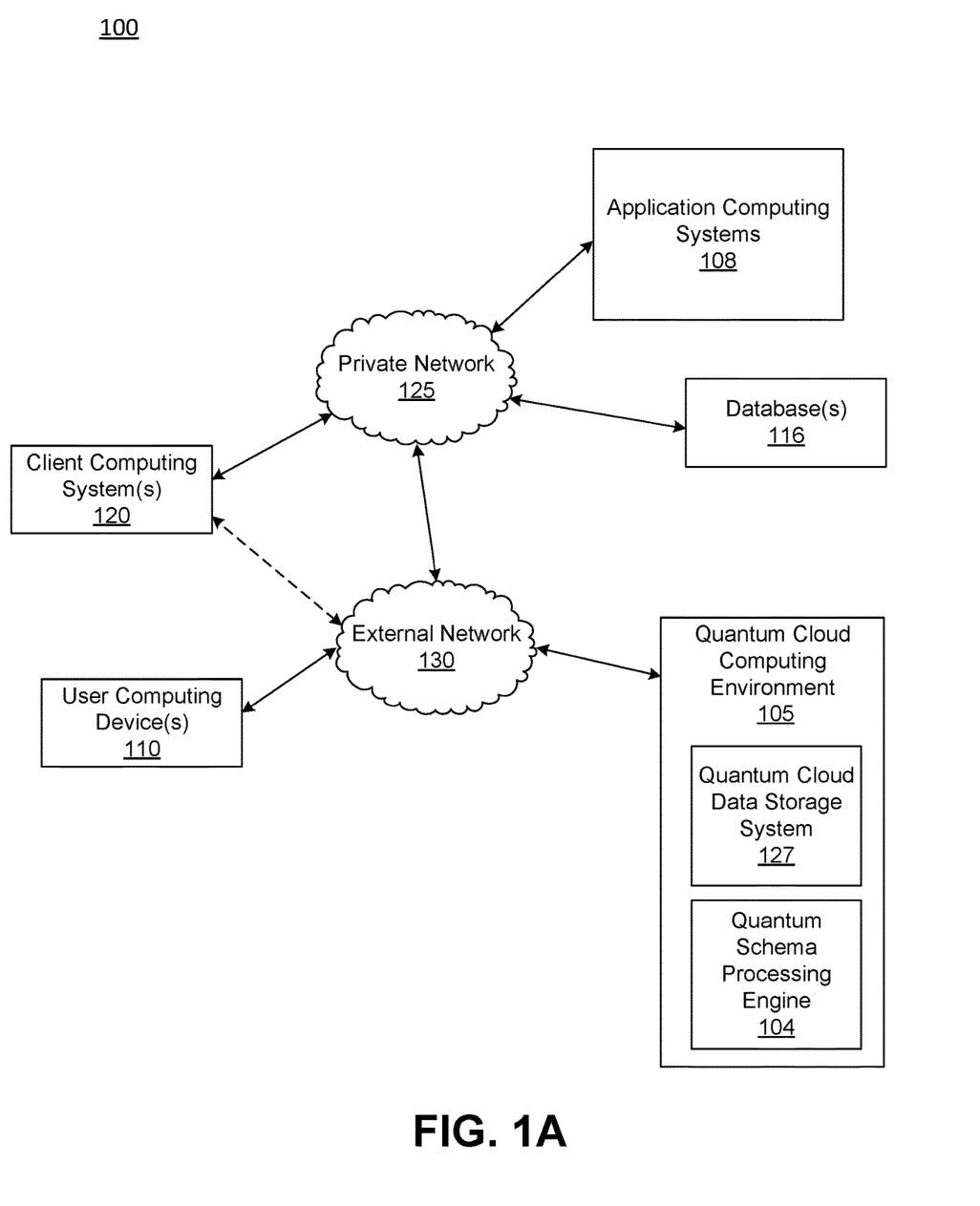
FIG. 1A shows an illustrative computing environment for artificial intelligence-based schema analysis and parsing of application programming interface requests, in accordance with one or more aspects described herein.

FIG. 1A shows an illustrative computing environment 100 for computing environment for artificial intelligence-based schema analysis and parsing of application programming interface requests, in accordance with one or more arrangements. The computing environment 100 may comprise one or more devices (e.g., computer systems, communication devices, and the like). The computing environment 100 may comprise, for example, a quantum cloud computing system 105, a quantum schema processing engine 104, one or more application systems 108, a quantum cloud data storage system, and/or one or more database(s) 116. The one or more of the devices and/or systems, may be linked over a private network 125 or a public or external network 130 associated with an enterprise organization (e.g., a financial institution, a business organization, an educational institution, a governmental organization and the like). The computing environment 100 may additionally comprise one or more client computing systems 120 and one or more user devices 110 connected, via the public and/or external network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3$^{rd}$ Generation Partnership Project (3GPP) cellular protocol, a hypertext transfer protocol (HTTP), etc.). While FIG. 1A shows the quantum schema processing engine 104 and the quantum cloud data storage system 127 as being incorporated within the quantum cloud computing environment 105, one or both of the quantum schema processing engine 104 and the quantum cloud data storage system 127 may be implemented as a separate computing system.

The quantum cloud computing system 105 may comprise one or more computing devices and/or other computer components (e.g., processors, memories, communication interfaces) configured to perform one or more functions as described herein, such as and including the quantum schema processing engine 104 and/or the quantum cloud data storage system 127. Further details associated with the architecture of the quantum schema processing engine 104 are described with reference to FIG. 1B.

The application computing systems 108 and/or the client computing systems 120 may comprise one or more computing devices and/or other computer components (e.g., processors, memories, communication interfaces). In addition, the application computing systems 108 and/or the client computing systems 120 may be configured to host, execute, and/or otherwise provide one or more enterprise applications. In some cases, the application computing systems 108 and/or the client computing systems 120 may host one or more services configured facilitate operations requested through one or more API calls, such as data retrieval and/or initiating processing of specified functionality. In some cases, the client computing systems 120 may be configured to communicate with one or more of the application computing systems 108 such as via direct communications and/or API function calls and the services. In some cases, the application computing systems 108 and/or the client computing systems 120 may request a schema for accessing data via an API call to the quantum cloud computing environment 105. The API call may be processed by the quantum schema processing engine 104, which may then identify and return one or more schemas identified from the quantum cloud data storage system. In an arrangement where the private network 125 is associated with a financial institution (e.g., a bank), the application computing systems 108 may be configured, for example, to host, execute, and/or otherwise provide one or more transaction processing programs, such as an online banking application, fund transfer applications, and/or other programs associated with the financial institution. The application computing systems 108 and/or the client computing systems 120 may comprise various servers and/or databases that store and/or otherwise maintain account information, such as financial account information including account balances, transaction history, account owner information, and/or other information. In addition, the application computing systems 108 and/or the client computing systems 120 may process and/or otherwise execute transactions on specific accounts based on commands and/or other information received from other computer systems comprising the computing environment 100. In some cases, one or more of the application computing systems 108 and/or the client computing systems 120 may be configured, for example, to host, execute, and/or otherwise provide one or more transaction processing programs, such as electronic fund transfer applications, online loan processing applications, and/or other programs associated with the financial institution.

The application computing systems 108 may be one or more host devices (e.g., a workstation, a server, and the like) or mobile computing devices (e.g., smartphone, tablet). In addition, an application computing systems 108 may be linked to and/or operated by a specific enterprise user (who may, for example, be an employee or other affiliate of the enterprise organization) who may have administrative privileges to perform various operations within the private network 125. In some cases, the application computing system 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 120 may comprise one or more computing devices and/or other computer components (e.g., processors, memories, communication interfaces). The client computing systems 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing systems 120 is for processing an electronic exchange of goods and/or services. The client computing systems 120 may be associated with a specific goods purchasing activity, such as purchasing a vehicle, transferring title of real estate may perform communicate with one or more other platforms within the client computing systems 120. In some cases, the client computing system 120 may integrate API calls to request data, initiate functionality, or otherwise communicate with the one or more application systems 108, such as via the services. For example, the services may be configured to facilitate data communications (e.g., data gathering functions, data writing functions, and the like) between the client computing systems 120 and the one or more application systems 108. In some cases, the services may facilitate communications to and/or from the quantum cloud computing environment 105 to identify a schema for use in obtaining data from one or more databases.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the application computing systems 108 and/or the client computing systems 120. For example, the database(s) 116 may store information for use by the application computing systems 108 and/or client computing systems 120 to provide products and/or services, and the like. In some cases, the information stored the databases may be in one or more formats (e.g., a binary format, a JavaScript Object Notation (JSON) format, one or more document formats (e.g., doc, docx, pdf, txt, xls, tiff, and the like), an extensible markup language (XML) format, a structured query language (SQL) format, and/or the like), may be relational databases and/or may be non-relational databases. In some cases, schemas used for accessing data within the databases 116 may be uploaded or otherwise stored in a cloud computing environment, such as the quantum cloud data storage system 127 of the quantum cloud computing environment 105

In an arrangement, the database(s) 116 may be used for other purposes as described herein. In some cases, the client computing system 120 may write data or read data to the database(s) 116 via the services.

In one or more arrangements, quantum cloud computing system 105, the quantum schema processing engine 104, the quantum cloud data storage system 127, the application computing systems 108, the client computing systems 120, the databases 116, the user devices 110, and/or the other devices/systems in the computing environment 100 may be any type of computing device capable of receiving input via a user interface, and communicating the received input to one or more other computing devices in the computing environment 100. For example, quantum cloud computing system 105, the quantum schema processing engine 104, the quantum cloud data storage system 127, the application computing systems 108, the client computing systems 120, the databases 116, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the quantum cloud computing system 105, the quantum schema processing engine 104, the quantum cloud data storage system 127, the application computing systems 108, the client computing systems 120, the databases 116, the user devices 110, and/or the other devices/systems in the computing environment 100 may, in some instances, be and/or comprise special-purpose computing devices configured to perform specific functions.

Figure 1B:
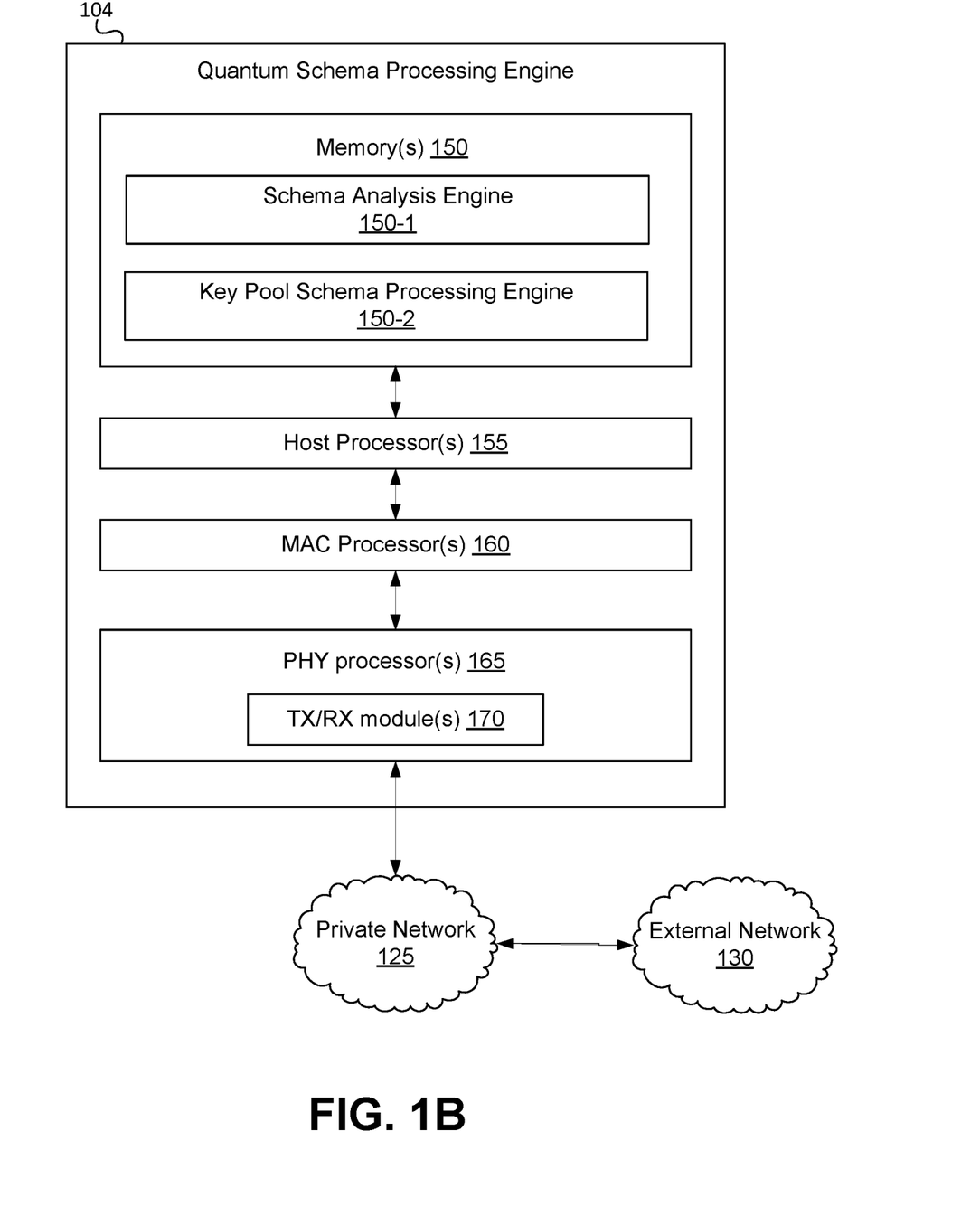
FIG. 1B shows an illustrative computing platform enabled for artificial intelligence (AI)-based schema analysis and parsing of application programming interface (API) requests, in accordance with one or more aspects described herein.

FIG. 1B shows an illustrative quantum schema processing engine 104 in accordance with one or more aspects described herein. The quantum schema processing engine 104 may be a stand-alone device and/or may at least be partial integrated with the development computing system 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The quantum schema processing engine 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the quantum schema processing engine 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the quantum schema processing engine 104 may be configured to execute machine readable instructions stored in memory 150. The memory 150 may comprise (i) one or more program modules/engines having instructions that when executed by the one or more processors cause the quantum schema processing engine 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the quantum schema processing engine 104 and/or by different computing devices that may form and/or otherwise make up the quantum schema processing engine 104. For example, the memory 150 may have, store, and/or comprise a schema analysis engine 150-1, a key pool schema processing engine 150-2, and/or the like. The schema analysis engine 150-1 may have instructions that direct and/or cause the quantum schema processing engine 104 to perform one or more operations associated with collecting schema data sets, training an AI model based on the collected schema data sets, minimizing an objective schema function, and returning one or more matched schemas to a requesting application, and the like. The key pool schema processing engine 150-2 may have instructions that may cause the quantum schema processing engine 104 to process schema source data sets, identify a schema format associated with a request and/or a schema, encrypting schema data (e.g., non-public information), and to provide output identifying the same. Following the return, the model may be automatically retrained based on results of the identification and/or feedback on whether the schema information was returned and/or a correct format.

While FIG. 1A illustrates the quantum cloud computing system 105, the application computing systems 108, the client computing systems 120, the databases 116, the user devices 110, as being separate elements connected in the public network 130 and/or the private network 125, in one or more other arrangements, functions of one or more of the above may be integrated in a single device/network of devices. For example, elements in the quantum schema processing engine 104 and/or the quantum cloud data storage system 127, (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, the client computing systems 120, and/or the application computing systems 108.

Figure 2:
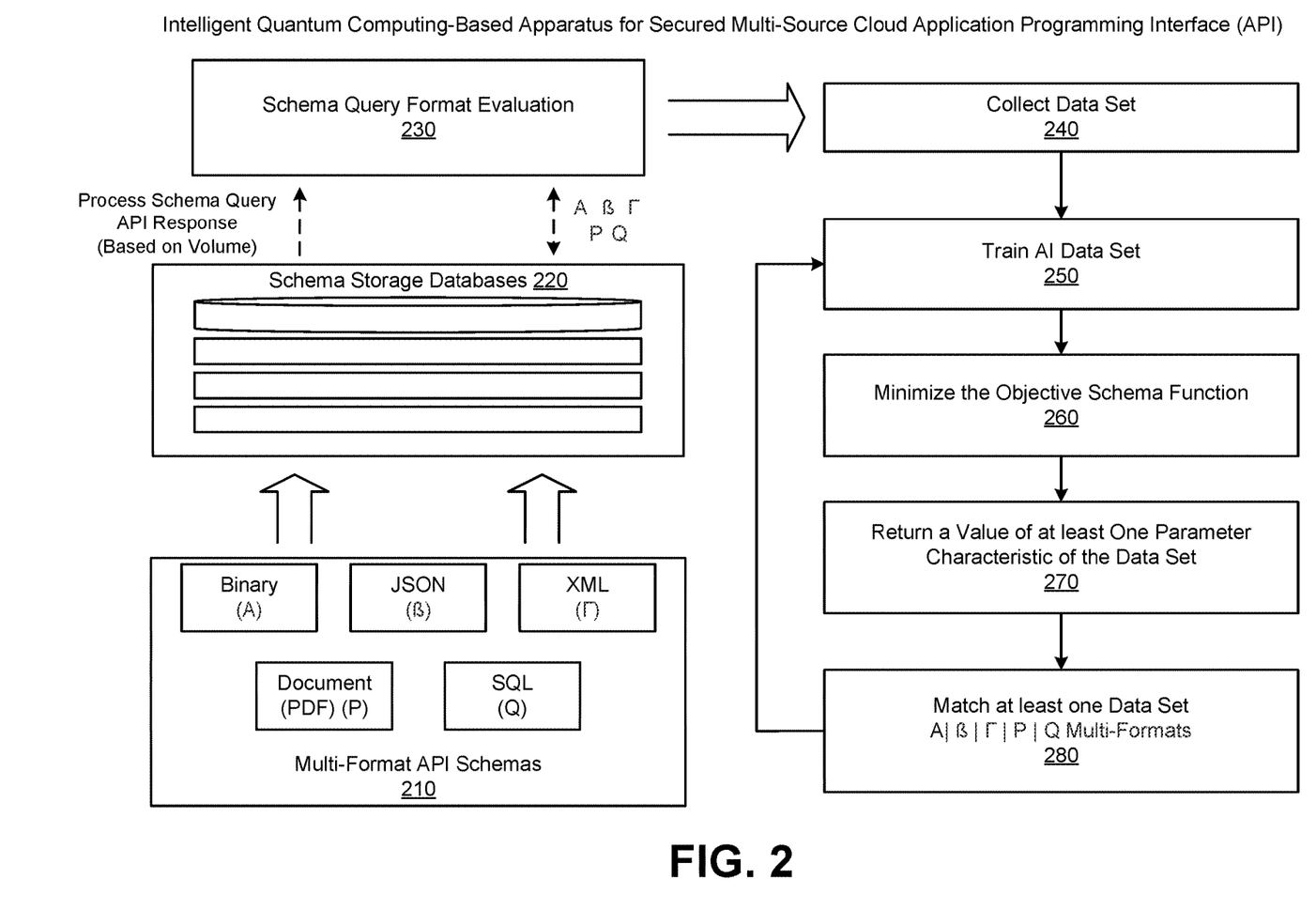
FIG. 2 shows an illustrative quantum computing apparatus and method for secured multi-source cloud API interface processing in accordance with one or more aspects described herein.

FIG. 2 shows an illustrative quantum computing apparatus and method for secured multi-source cloud API interface processing in accordance with one or more aspects described herein. The enterprise organization may have multiple databases (e.g., databases 116) storing information associated with multiple applications, services, and/or other data collection activities. Because the applications and/or services may be developed by different groups, different purposes, and/or different times, the database technologies maybe different. For example, the databases 116 may be relational databases, non-relational databases, big data databases, and the like. In some cases, the databases may store information in one or more formats, such as a binary format, a JSON format, an XML format, one or more document formats (e.g., pdf, txt, xls, doc, docx, and the like), a SQL format, and/or the like. Data stored in the databases 116 may be stored and/or organized based on one or more schemas, such as the multiformat API schemas 210.

Schema information may be uploaded to one or more schema storage databases 220 on a centrally located device (e.g., the quantum cloud data storage system 127 within the quantum cloud computing environment 105), where information associated with each schema type may be stored in a separate database.

A database schema may define data organization within one or more database and may be based on one or more logical constraints or parameters such as, table names, fields, data types, and the relationships between these entities. Schemas may use one or more representations to communicate the architecture of the database, becoming the foundation for an organization's data management discipline for a particular time period and/or for an application or service. Each schema may represent one or more data models to serve a variety of roles, such as database users (e.g., applications, services, and the like), database administrators, and/or programmers. In some cases, the schema may be used to navigate data structures within individual databases and/or across databases such as to facilitate application operation, conduct reporting or other valuable business analyses. The schemas may describe how data relates to tables and/or other data models, but do not store data themselves. A database instance may contain data values associated with a particular schema.

A schema may correspond to a particular schema type, such as a conceptual database schema, a logical database schema, and a physical database schema. The conceptual schema may be used to define a high-level view of a particular system contents, organization and/or business rule structure. The logical database schema may define schema objects with information, such as table names, field names, entity relationships, and integrity constraints, and/or other rules that govern the database. The physical database schemas may define technical information that the logical database schema type lacks along with contextual information, such as table names, field names, entity relationships, and/or the syntax that will be used to create these data structures within the data storage environment.

With logical and/or physical schemas, database tables have a primary key and/or a foreign key, which act as unique identifier(s) for individual entries in a table. These keys are used, for example, in SQL statements to join tables to create a unified view of information. Relationship diagrams between tables may be used to understand relationships between keys. While conceptual, logical, and physical schemas contain different levels of information about databases, other schemas (e.g., star schemas and snowflake schemas) may be used to differently represent those relationships. For example, a star schema may be a relational database schema with a central fact table is surrounded by dimension tables. A snowflake schema includes a fact table connected to many dimension tables. The dimension tables may be connected to each other via other connections, such as a many-to-one relationship.

A method of identifying and returning a database schema based on an API request may begin with a schema query format evaluation in response to the API request. For example, an order that the schema query API response may be processed may be based on a volume of information stored and/or a volume of requests received to identify a schema format. In some cases, the API request may identify particular parameters associated with the information required that may be used as characteristic parameters of the schema. Schema parameters describe different types of objects or information, and have attributes depending on the type of description they contain, and/or may include type-specific attributes. In some cases, parameters may include an object ID, a column number parameter, a list of columns, a data type parameter, a type parameter, and the like. The parameters associated with particular schemas may be associated with a schema type and/or database structure associated with the schema. Each dataset has its own unique schema that may be defined, in part, by parameters corresponding to feature types, permitted geometries, user-defined attributes and other rules that define or restrict its content. The schema analysis engine 150-1 may collect a data set from the schema storage database based on the request to generate a training data set. At 250, the schema analysis engine 150-1 may train an AI model based on the training data set collected from the databases 220, where an objective AI function may include one schema variable parameter that is characteristic of the dataset. During the training process, the training data set may be annotated such as by associating a data format and/or a data source to the uploaded data. In some cases, the model may be trained on a portion of the data set, where additional data may be used to augment the data during the training process. Once the model has been trained, a portion of the collected data, or newly collected data may be used to validate the training, such as to avoid and/or identify model restriction and/or overtraining. At 260, the quantum processor (e.g., the key pool schema processing engine) may process the data such as via an AI function to minimize the objective schema function to determine a value of the at least one parameter that is characteristic of the data set. At 270, the model may return a value of the at least one parameter characteristic of the data set to the schema processing engine 150-1. At 280, the schema processing engine 150-1 may identify at least one AI parameter match of at least one of the data formats associated with the schema to identify a schema and a schema format.

Figure 3:
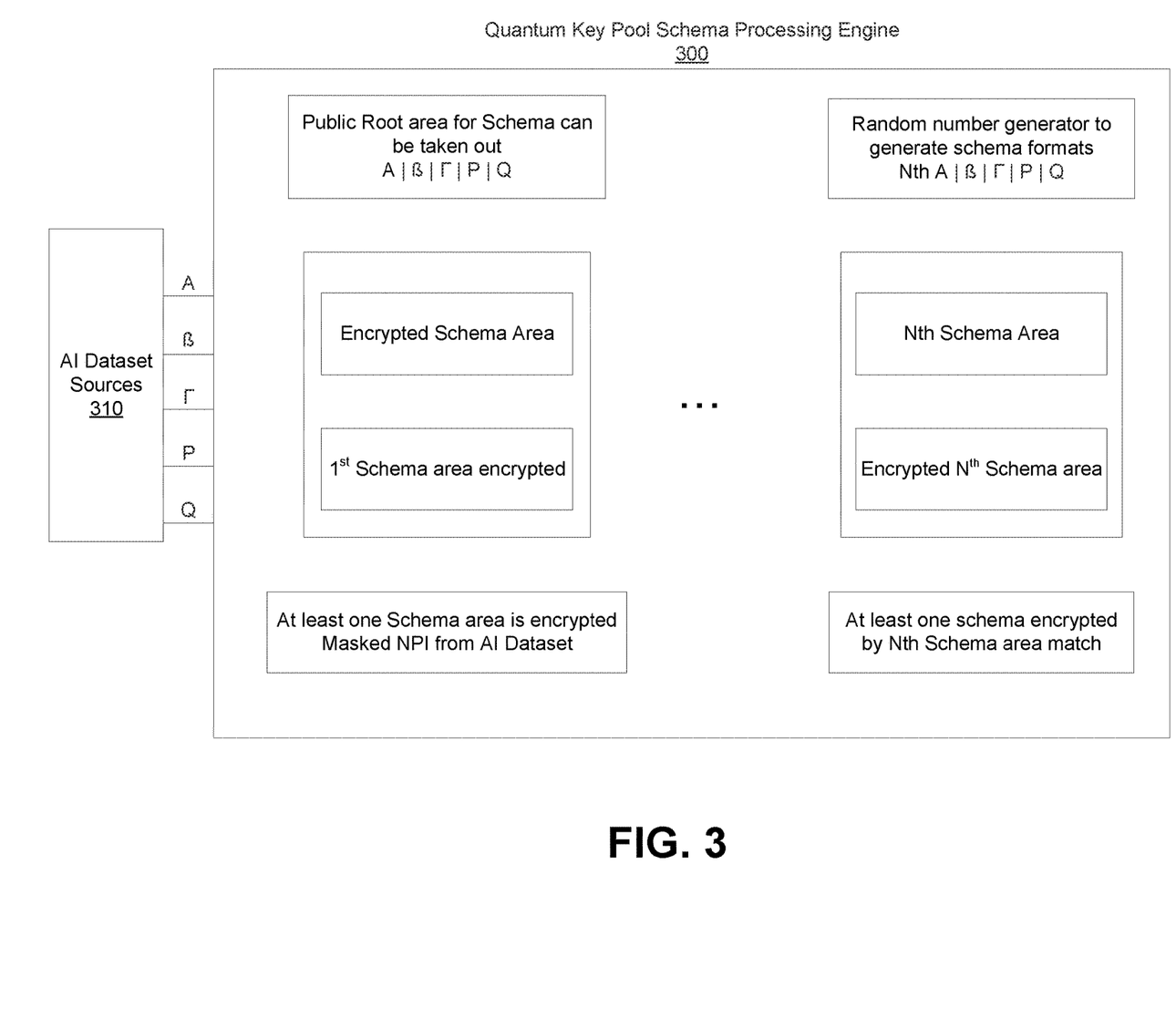
FIG. 3 shows an illustrative quantum key pool schema processing engine, in accordance with one or more aspects described herein.

FIG. 3 shows an illustrative quantum key pool schema processing engine 300, such as the key pool schema processing engine 150-2, in accordance with one or more illustrative arrangements. In some cases, the quantum key pool schema processing engine 300 may access data collected corresponding to the schemas, such as the AI dataset sources 310 (e.g., the data collected from the schema storage databases 220). Based on the number of data formats available the quantum key pool schema processing engine 300 may analyze the dataset to identify an initial schema area, such as by identifying a public root area that can be removed. Further, based on the request, the initial schema may be analyzed to identify an encrypted schema area and may encrypt data associated with the schema area. Further, the at least one schema area is encrypted and/or has non-public information masked from the AI dataset. Additionally, the quantum key pool schema processing engine 300 may then analyze (e.g., recursively analyze) the schemas in the data set based, such as via a randomly generated number to generate schema formats and may perform this operation multiple (e.g., N) times, where each schema area may be identified and encrypted to generate at each level, a schema encrypted by the $N^{th}$ schema area match. In some cases, the quantum key pool schema processing engine may facilitate connection pooling via the quantum key to allow connections to different databases associated with the schemas to be reused to improve connectivity efficiency, such as by reducing an impact in handshake latency. Further the quantum key pool schema processing engine 300 may facilitate the distribution of keys with verifiable security, e.g., quantum key distribution (QKD), where security is guaranteed by the fundamentals of quantum information theory, with or without additional in computational security-based cryptography. For example, QKD may be used to establish information-secure cryptographic keys, such as on a protocol level. In some cases, the quantum key pool schema processing engine 300 may implement a key-as-a-service (KaaS) approach where the quantum key pool may be defined in a control layer of a network hierarchy and may be mapped to the quantum key pool via an API interface.

Figure 4:
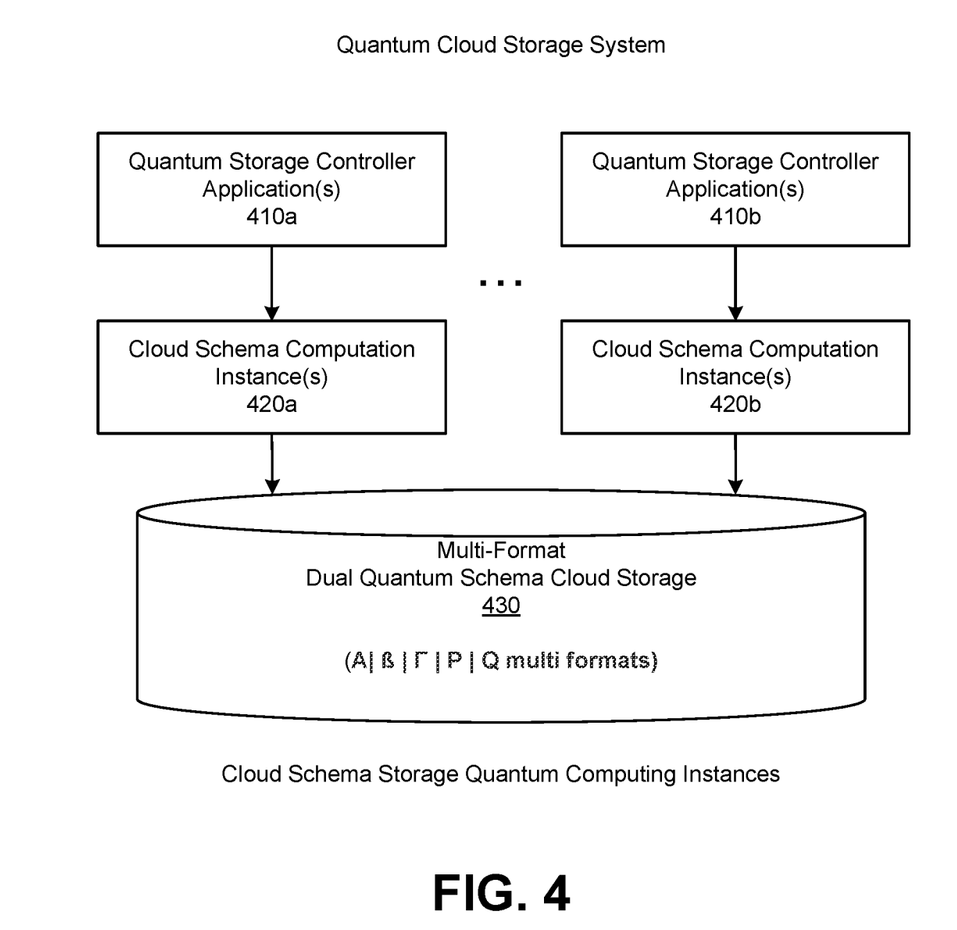
FIG. 4 shows an illustrative quantum cloud computing system in accordance with one or more aspects described herein.

FIG. 4 shows an illustrative quantum cloud computing system in accordance with one or more aspects described herein. For example, a plurality of quantum storage controller applications 410a and 410b may process information via instances of the cloud schema computation module 420a and 420b (e.g., the quantum schema processing engine 104) to access and return data stored in a multi-format dual quantum schema cloud storage repository 430, which stores large numbers of schemas of each of a multitude of formats. Each schema is associated with a data repository and its associated data formatting, so that an enterprise application may request, via an API function, a schema for use in accessing data within a particular database.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising
a data consumer computing device processing an application that requests data from one or more databases;
a quantum cloud computing environment comprising:
  a plurality of schema storage databases, each schema storage database being associated with a schema format of a plurality of schema formats;
  a quantum computing device comprising:
    a quantum processor; and
    non-transitory memory storing instructions that, when executed by the quantum processor, cause the quantum computing device to:
    collect, from the plurality of schema storage databases, a schema data set;
    identify a public root area of a first schema;
    remove the public root area of the first schema;
    identify an encrypted schema area of the first schema; and
    mask non-public information from a first database associated with the first schema;
    train an analysis model based on the schema data set;
    associate, by a schema analysis engine, at least one characteristic schema parameter to each schema, wherein the at least one characteristic schema parameter is characteristic of an associated data set;
    receive, from the application, an application programming interface (API) function call for a schema to obtain data from the one or more databases;
    identify, by an artificial intelligence function and based on the API function call, a value of a characteristic parameter of a schema of the schema data set;
    return a value of the characteristic parameter of the schema data set;
    identify a schema and a schema format match from the schema data set based on the characteristic parameter; and
    communicate, via a network to the data consumer computing device in response to the API function call, information corresponding to the schema matching the schema format associated with the characteristic parameter.

2. The system of claim 1, wherein the data consumer computing device requests, via an application programming interface, the request for a data schema format associated with a particular database of the one or more databases.

3. The system of claim 1, wherein the instructions to identify a value of a characteristic parameter of the data set further cause the quantum computing device to minimize an objective schema function to determine a value of the characteristic parameter of the data set.

4. The system of claim 1, wherein the instructions further cause the quantum computing device to:
  identify a public root area of a second schema;
  remove the public root area of the second schema;
  identify an encrypted schema area of the second schema; and
  mask non-public information from a second database associated with the second schema.

5. The system of claim 1, wherein the instructions further cause the quantum computing device to:
  identify a public root area of each schema of a plurality schemas;
  remove the public root area of each schema of the plurality of schemas;
  identify an encrypted schema area of each schema of the plurality schemas; and
  mask non-public information from each database associated with each schema of the plurality schemas.

6. The system of claim 1, wherein the schema format comprises one of a binary format, a JavaScript Object Notation (JSON) format, a document formats, an extensible markup language (XML) format, and a structured query language (SQL) format.

7. A quantum computing device communicatively coupled to at least one data consumer computing device that is processing an application that requests data from one or more databases, the quantum computing device comprising;
  a quantum processor; and
  non-transitory memory storing instructions that, when executed by the quantum processor, cause the quantum computing device to:
    collect, from a plurality of schema storage databases, a schema data set;
    identify a public area of a first schema;
    identify an encrypted schema area of the first schema; and
    mask non-public information from a data set associated with the first schema;
    train an analysis model based on the schema data set;
    associate, by a schema analysis engine, at least one characteristic schema parameter to each schema, wherein the at least one characteristic schema parameter is characteristic of an associated data set;
    receive, from an application, an application programming interface (API) function call for a schema to obtain data from the one or more databases;
    identify, by an artificial intelligence function and based on the API function call, a value of a characteristic parameter of the schema data set;
    return a value of the characteristic parameter of the schema data set;
    identify a schema and a schema format match from the schema data set based on the characteristic parameter; and communicate, via a network to the data consumer computing device in response to the API function call, information corresponding to the schema matching the schema format associated with the characteristic parameter.

8. The quantum computing device of claim 7, wherein the data consumer computing device requests, via an application programming interface, the request for a data schema format associated with a particular database of the one or more databases.

9. The quantum computing device of claim 7, wherein the instructions to identify a value of a characteristic parameter of the data set further cause the quantum computing device to minimize an objective schema function to determine a value of the characteristic parameter of the data set.

10. The quantum computing device of claim 7, wherein the instructions further cause the quantum computing device to:
    identify a public root area of a second schema;
    identify an encrypted schema area of the second schema; and
    mask non-public information from the data set associated with the second schema.

11. The quantum computing device of claim 7, wherein the instructions further cause the quantum computing device to:
    identify a public root area of each schema of a plurality schemas;
    identify an encrypted schema area of each schema of the plurality schemas; and
    mask non-public information from the data set associated with each schema of the plurality schemas.

12. The quantum computing device of claim 7, wherein the schema format comprises one of a binary format, a JavaScript Object Notation (JSON) format, a document formats, an extensible markup language (XML) format, and a structured query language (SQL) format.

13. A method comprising:
    collecting, from a plurality of schema storage databases based on a received application programming interface (API) request for a schema type identification, a schema data set, wherein each schema storage database being associated with a schema format of a plurality of schema formats;
    identifying a public root area of a first schema;
    identifying an encrypted schema area of the first schema; and
    masking non-public information from a data set associated with the first schema;
    training an analysis model based on the schema data set;
    associating, by a schema analysis engine, at least one characteristic schema parameter to each schema, wherein the at least one characteristic schema parameter is characteristic of an associated data set;
    receiving, from an application, an application programming interface (API) function call for a schema to obtain data from one or more databases providing data to data consumer computing devices;
    identifying, by an artificial intelligence function and based on the API function call, a value of a characteristic parameter of the schema data set;
    returning a value of the characteristic parameter of the schema data set;
    identifying a schema and a schema format match from the schema data set based on the characteristic parameter; and
    communicating, via a network to a data consumer computing device processing the application that requests data from one or more databases and in response to the API function call, information corresponding to at least one schema matching the schema format.

14. The method of claim 13, further comprising minimizing an objective schema function to determine a value of the characteristic parameter of the data set.

15. The method of claim 13, further comprising:
    identifying a public root area of a second schema;
    identifying an encrypted schema area of the second schema; and
    masking non-public information from the data set associated with the second schema.

16. The method of claim 13, further comprising:
    identifying a public root area of each schema of a plurality schemas;
    identifying an encrypted schema area of each schema of the plurality schemas; and
    masking non-public information from the data set associated with each schema of the plurality schemas.

17. The method of claim 13, wherein the schema format comprises one of a binary format, a JavaScript Object Notation (JSON) format, a document formats, an extensible markup language (XML) format, and a structured query language (SQL) format.

* * * * *